UNITED STATES PATENT OFFICE.

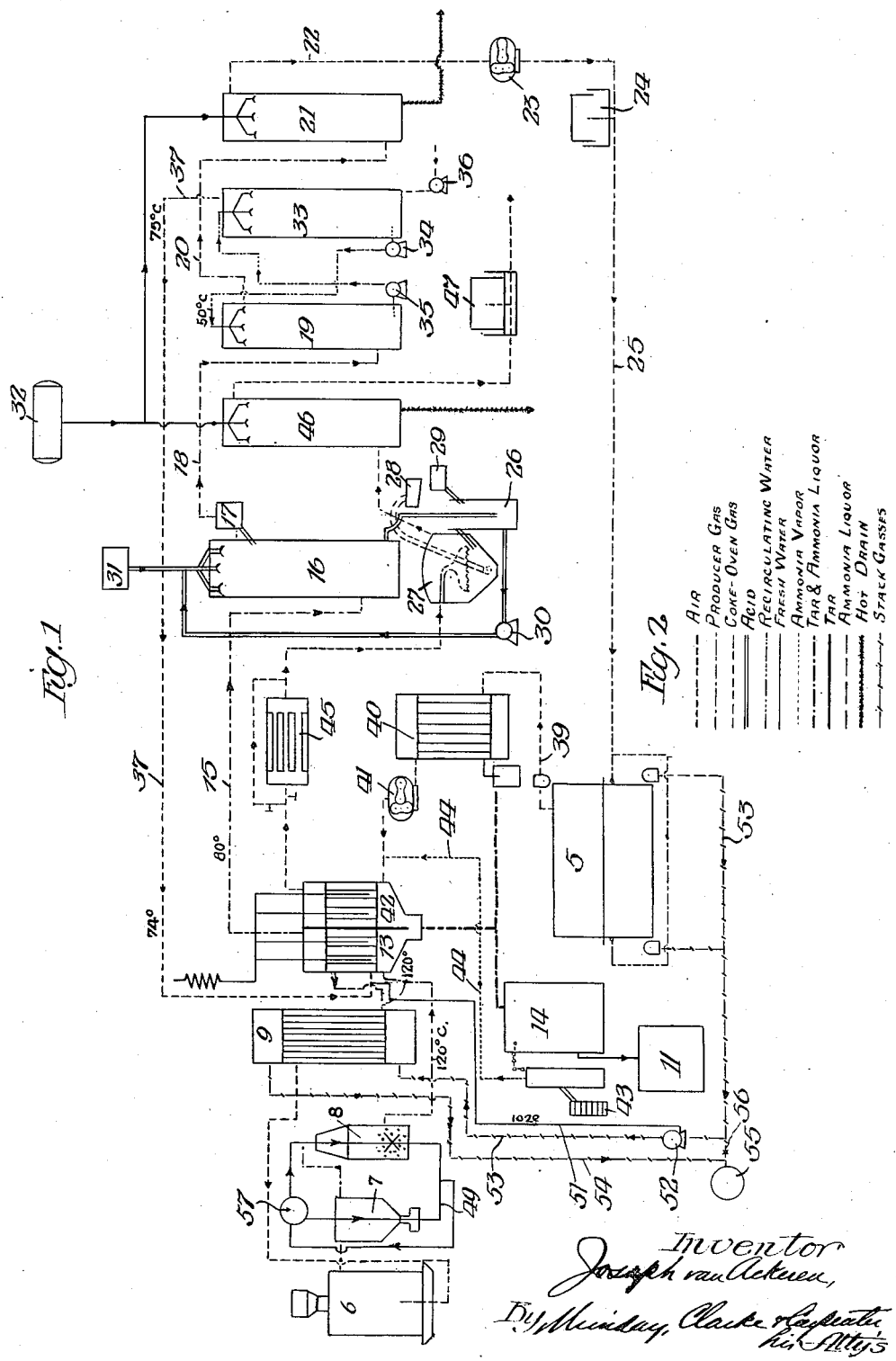

JOSEPH VAN ACKEREN, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

AMMONIA AND TAR RECOVERY PROCESS.

1,375,475.     Specification of Letters Patent.     Patented Apr. 19, 1921.

Application filed August 21, 1919. Serial No. 318,868.

*To all whom it may concern:*

Be it known that I, JOSEPH VAN ACKEREN, a citizen of the United States, residing in Pittsburgh, in the county of Allegheny and State of Pennsylvania, have invented a new and useful Improvement in Ammonia and Tar Recovery Processes, of which the following is a specification.

This invention relates primarily to the recovery of tar and of ammonia from ammonia and tar charged gas, and has for one of its objects the efficient production of a clean, dust-free and high-grade tar, and for a further object the recovery of ammonia, from such gas, as high-grade ammonium sulfate, with great economy of heat, or steam, and with simplicity and directness in the operation of the apparatus.

The invention is of particular utility in connection with the process for the recovery of tar and ammonia from producer-gas, and from coke-oven gas, resulting in a combined production of high-grade ammonium sulfate derived from the ammonia of both the producer-gas and the coke-oven gas in a unitary operation, as disclosed in my prior Patent No. 1,307,571, dated June 24, 1919. For convenience, the present description will be confined to this particular use of the invention; it will be understood, however, that the invention is capable of other applications, for example it may be applied to one of these gases, or to gas otherwise derived from the carbonization of coal; therefore it is manifest that the invention is by no means limited in scope to the particular application or specific use herein described. The invention may also have such other objects and results as are found to obtain in the processes hereinafter set forth and claimed.

In the accompanying drawings:

Figure 1 is a conventional diagram illustrating an embodiment of the invention in a preferred arrangement of apparatus for practising its processes.

Fig. 2 is a key to the symbols employed in the various lines that show the connections between the apparatus indicated in Fig. 1.

Referring to the drawing, there is indicated at 5 a coke-oven battery, from which coke-oven gas is derived, and which is fired with producer-gas derived from the gas-producer 6. The evolved producer-gas from the gas-producer 6 passes first to the dust-catcher 7, preferably in the form of a free chamber in which it is cooled preliminarily by means of cold water, sprayed into said dust-catcher 7, as indicated by the water line 49; also in passing through the dust-catcher, the speed of the producer-gas is reduced somewhat as a result of the expanded volume of the chamber, whereupon the dust particles which pass over with the gas from the producer drop out from the gas and are precipitated in the bottom of the dust-catcher. The producer-gas entering the dust-catcher is still at a very high temperature, about 450° C., and its water saturation point is only about 80° C., and therefore it is still greatly super-heated with respect to its water and tar, and these and its other vaporizable content are carried as vapor into and through the dust-catcher 7, and said dust-catcher acts only to free the passing gas from dust and other solid impurities in its current, and partially to cool the gas. From the dust-catcher 7, the producer-gas, after having been partially cooled, but still above its water saturation point, passes to the disintegrator 8. In the disintegrator the gas is further cooled by contact with cold water sprayed into the disintegrator, as indicated by the water line 49, the gas being subjected to a thorough intermixing treatment with the cooling water in the disintegrator. The water from the dust-catcher 7 and disintegrator 8 may pass to a circulating pump 57 to which cooling fresh water is added, and, from the latter be returned to the dust-catcher and disintegrator, thereby maintaining a water circulating system. From the disintegrator, the producer-gas issues with its temperature reduced to about 120° C., and, still carrying its water and tar, as vapor, passes to the compartment 13 of an electrical tar precipitator, in which it flows in counter-current with the saturated air, the latter being at a temperature of about 80° C. As a result of the heat interchange, between the partially-cooled producer-gas and the saturated air, and also, because of heat losses from the gas by radiation to the atmosphere, the gas in the compartment 13 of the electrical precipitator is cooled down to a temperature of about 80° C. At a temperature of 120° C. of the gas, the tar begins to drop out, and, approaching the character of a finely comminuted mist, as the gas cools, will be precipitated; the clean tar so precipitated is discharged into the tar and liquor tank 14, from which it flows into the tar tank 11.

The tar-feed producer-gas passes from the compartment 13, through the gas line 15, to the hot-acid washer tower 16, which it enters at a temperature of about 80° C., at about its saturation point. In the acid tower, the ammonia is absorbed from the producer-gas and the ammonia-freed producer-gas leaves the acid washer at a temperature of about 80° C. The acid solution in the acid tower is kept hot by the absorption reaction so that there cannot be any diluting of the ammonia-absorbing acid solution that is flowing through said acid washer; and, by reason of the little super-heat remaining in the gas, practically no water is picked up by the gas in passing through said acid washer, and hence there is no precipitation of ammonium sulfate in said acid washer.

Thence, the ammonia-freed gas flows through the acid separator 17, in which it is freed of such acid as it may carry with it, and then flows through the gas line 18 to the first-stage final cooler 19, through which it flows in counter-current with warm water that enters such cooler at about 50° C. In this cooler, the gas is cooled to about 65° C. and to a great extent dehydrated, and thence passes through the gas line 20 to the second-stage final cooler 21. Through the second-stage final cooler 21, the gas passes in counter-current with cold water and issues finally dehydrated and cooled down to a temperature of about 25° C. The clean, cool, and relatively dry producer-gas is drawn off through the gas line 22 by the exhauster 23, which forwards the gas to the producer-gas holder 24 and on, through the producer-gas line 25, to the before-mentioned coke-ovens 5, in which the producer-gas is burned to provide the heat for the coking of the coal charges in the oven.

The ammonia-charged acid solution from the aforesaid acid washer 16 is conveyed to the mother-liquor tank 26 which feeds the saturater 27. The mother-liquor tank 26 also receives the drain from the saturater drain table 28 and centrifugal drier 29; and the surplus acid solution from said mother-liquor tank is forced back by the acid pump 30 to the acid washer 16, with the result that there is maintained a constant circulation of hot acid solution, to which a portion of fresh acid is constantly added from the acid tank 31.

The before-mentioned second-stage final cooler 21 for the producer-gas, is cooled by fresh water continually supplied from the water tank 32, and from this cooler the waste water flows to the sewer. The first-stage final cooler 19 for the producer-gas, however, receives its warm water at a temperature as before-mentioned of about 50° C., from the air saturater tower 33, from which water is drawn by the warm-water pump 34; the water issuing from said first-stage final cooler 19, has a temperature of about 80° C., and is forced by the hot-water pump 35 to the top of the said air saturater tower into which it is sprayed—there being, as just mentioned, a constant re-circulation of water through said first-stage final cooler and said air saturater tower.

The air to be saturated and heated is forced into said air saturater tower by the air fan 36, and enters the tower at a temperature of about 25° C. The air leaves the tower charged with water-vapor at a temperature of about 74° C. and is further charged with exhaust-steam passing through the steam line 51 from the exhaust of the fan 52 for conveying the waste gases, before the air enters the before-mentioned compartment 13 of the electrical precipitator. Exhaust-steam in the steam line 51 is at a temperature of about 102° C., and, mixing with the air saturated at a temperature of about 74° C., raises the temperature of the air, with the result that the saturation point of the air is also raised, and the air is capable of carrying the water vapor from the steam line 51. Thus, the air saturated at a temperature of about 80° C. enters the compartment 13 of the electrical precipitator and after absorbing heat from the before-mentioned producer-gas in said precipitator at a temperature of about 120° C., the saturated air emerges from the compartment 13 of the electrical precipitator at a temperature of about 116° C., and passes to the superheater 9.

In the super-heater 9, the air passes in counter-current with waste gases, preferably from the stack of the coke-ovens 5, which waste gases enter the super-heater at a temperature of about 300° C. The super-heated air emerges from the super-heater 9 with its temperature raised to about 250° C, and passes to the grate of the producer. The waste gases from the coke-ovens pass through a waste heat line 53 and fan 52 to the super-heater 9; from the super-heater 9 these gases, after a large proportion of their waste heat has been utilized in the super-heating of the saturated air, discharge through a stack line 54 to the stack 55. If desired, the super-heater may take all or part of the waste gas from the ovens. In order to effect this control, a by-pass 56 is introduced in the line 53, permitting a proportion of the waste gas from the coke-ovens to flow to the super-heater and another portion to the stack 55. The by-pass 56 may be further regulated so that the entire volume of waste heat gas from the coke-ovens flows to the super-heater and is discharged directly from the super-heater 9 into the stack 55. By the employment of the clean stack gases from the coke-ovens, there is eliminated stoppage of the tubes in the super-heater, such as might be occasioned by the use of the hot dust-charged producer - gas. The waste gases from the coke-ovens are quite clean and free from dust and hence the tubes in the super-heater last longer and do not have to be cleaned.

The coke-oven gas from the coke-ovens passes through the gas line 39, at a temperature of about 80° C. to the primary cooler 40, and is thence forwarded by the exhauster 41 to the compartment 42 of the electrical precipitator, the other before-mentioned compartment 13 of which serves for the precipitation of tar from the producer-gas. In the primary cooler 40, the coke-oven gas is cooled to about 25° C. and the consequent condensation of tar and ammonia liquor is drained from such cooler and conveyed to the tar and liquor tank 14, in which the tar and ammonia liquor are separated, the tar flowing off into the tar tank 11, and the ammonia liquor flowing to the ammonia still 43. The vapors from this still flow at a temperature of about 100° C., through the ammonia vapor line 44 leading into the coke-oven gas line between the exhauster 41 and the electrical precipitator compartment 42, and the mixture of such vapors and coke-oven gas enters the said precipitator compartment at a temperature of about 35° C. At this temperature, both the tar residue in the coke-oven gas and the water of the still vapors will be precipitated in said precipitator compartment 42, and the so precipitated tar and condensate flow off from the precipitator into the before-mentioned tar and liquor tank 14. The tar-freed coke-oven gas with its own content of ammonia and its mixture of ammonia vapor from the still flows from the electrical precipitator compartment 42 to the before-mentioned saturater 27, entering the same at a temperature of about 35° C., or such temperature may be raised a little by passing the gas through a small reheater 45 around which the gas is preferably by-passed on its way from the said precipitator 42 to the said saturater 27. Discharging through the saturation bath of the said saturater 27, the coke-oven gas both gives up its ammonia and effects the evaporation requisite to precipitate the ammonia sulfate derived not only from the said ammonia of the coke-oven gas, but also from the ammonia of the acid solution from the acid washer 16 for the producer-gas, thus accomplishing a combined and simultaneous recovery of the ammonia from both the coke-oven gas and the producer-gas, in a uniform and high grade of ammonium sulfate, all produced from one saturation bath. The coke-oven gas issuing from the saturater 27 at a temperature of about 45° C., passes to the final cooler 46, which is sprayed with cold water from the before-mentioned water tank 32; the finally cooled coke-oven gas at a temperature of about 25° C., passes from said final cooler to the coke-oven gas-holder 47, and thence to whatever service it may be employed in.

The processes of the invention may be practised in various ways, other than the particular embodiment that has been described for purposes of illustration, and still be within the scope and subject matter of the claims hereinafter made.

What is claimed is:

1. In a process for the production of ammonia from producer gas; the combination of steps that consists in: heating water-charged air going to a producer by passing such air in heat-exchanging-relation with a hot extraneously-derived gas of regulable temperature; extracting the tar from the producer gas; and then recovering the ammonia from the tar-freed gas, the ammonia production being controlled by the heating of the air by a waste gas of regulable temperature; substantially as specified.

2. In a process for the recovery of tar and ammonia from producer gas, the combination of steps that consists in: concurrently cooling and precipitating the dust from the hot producer gas from the producer; further cooling and washing said producer gas with water; then precipitating the residue of the tar from such partially cooled but still hot gas; and then passing said gas through an acid wash to absorb the ammonia, substantially as specified.

3. In a process for the recovery of tar and ammonia from producer gas, the combination of steps that consists in: subjecting the hot producer gas from the producer to a water-wash treatment to precipitate the dust from said gas and to cool the gas to substantially the temperature of precipitation of the tar; then precipitating the tar from the partially cooled but still hot gas; and then passing such gas through an acid wash to absorb the ammonia, substantially as specified.

In testimony whereof I have hereunto set my hand this 15th day of August, 1919.

JOSEPH van ACKEREN.